Dec. 26, 1950      P. C. MALMSTEN      2,535,939
STOKER, INCLUDING GAS FEEDBACK PREVENTION MEANS
Filed May 4, 1946      2 Sheets-Sheet 1
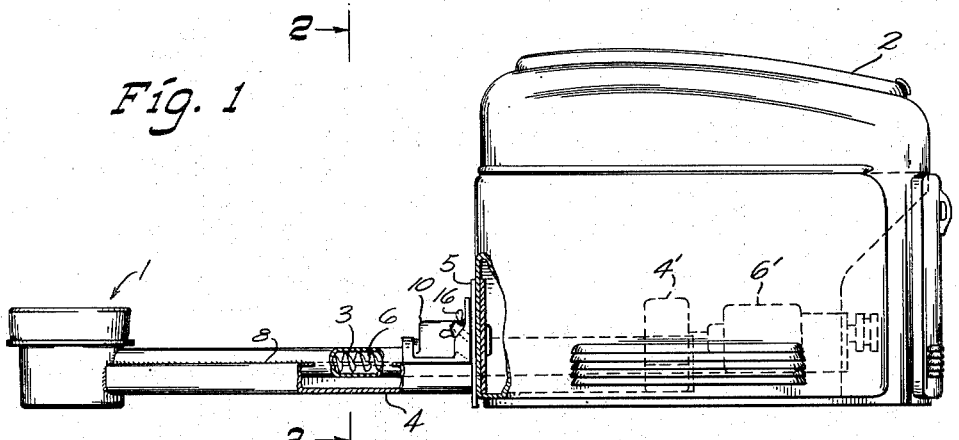
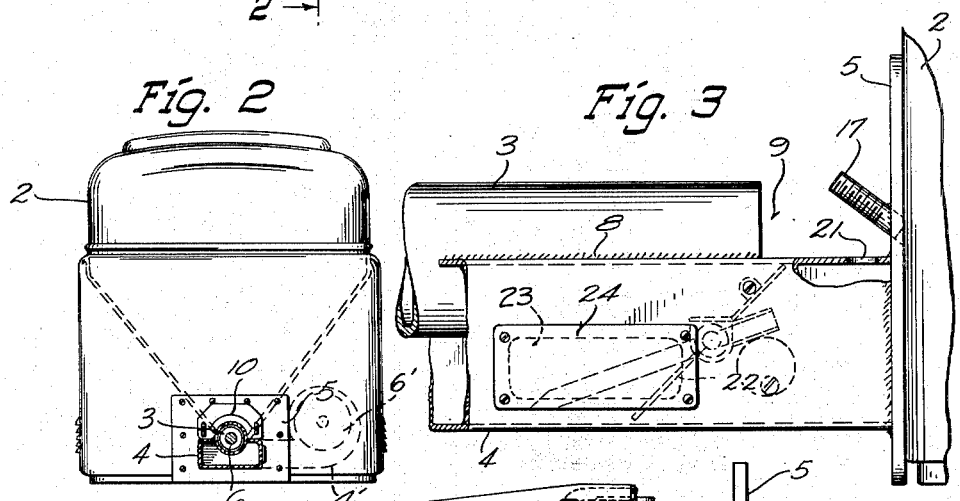
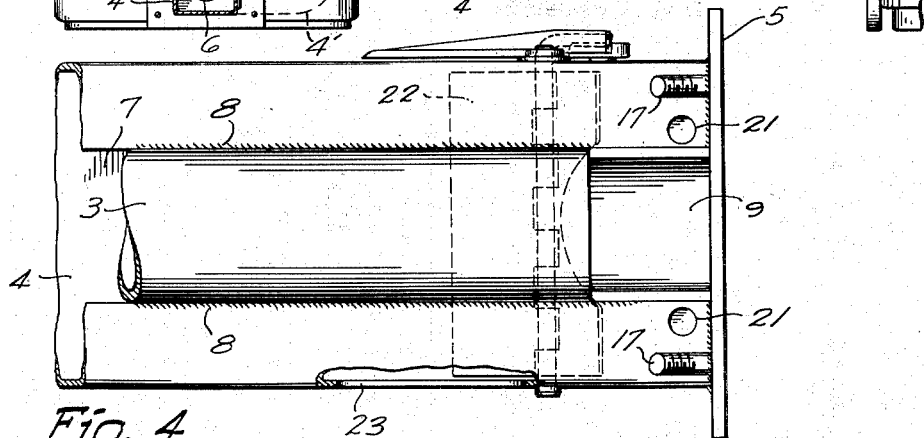
Inventor
Philip C. Malmsten
By
Attorney Dec. 26, 1950 P. C. MALMSTEN 2,535,939
STOKER, INCLUDING GAS FEEDBACK PREVENTION MEANS
Filed May 4, 1946 2 Sheets-Sheet 2
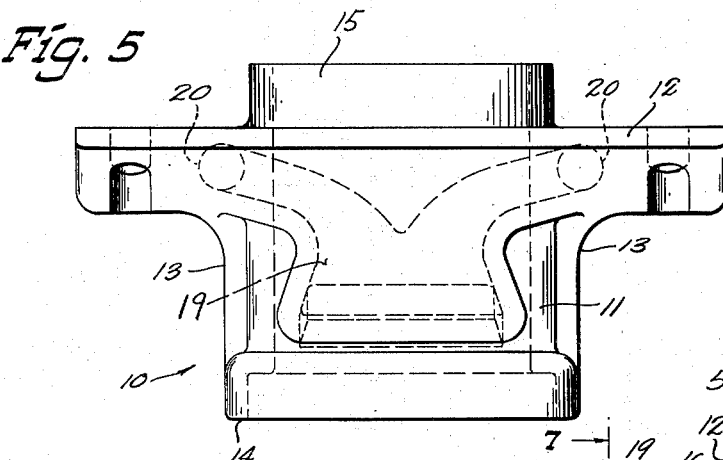
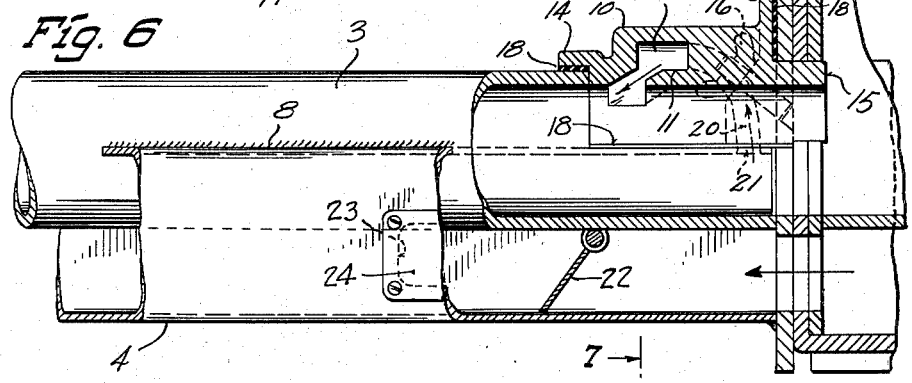
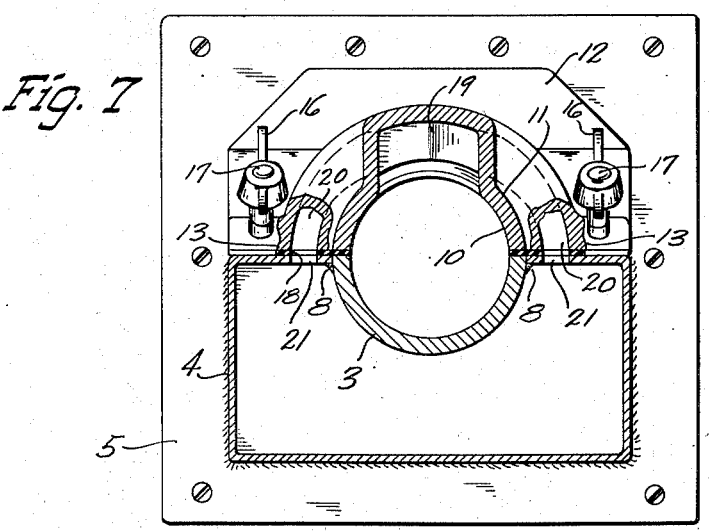
Inventor
Philip C. Malmsten
By
Attorney

UNITED STATES PATENT OFFICE 2,535,939

STOKER, INCLUDING GAS FEEDBACK PREVENTION MEANS

Philip C. Malmsten, Milwaukee, Wis., assignor to A. O. Smith Corporation, Milwaukee, Wis., a corporation of New York Application May 4, 1946, Serial No. 667,321

4 Claims. (Cl. 110—45)

This invention relates to a stoker construction and has particular relation to the construction and assembly of the shear plate of the stoker in combination with the air supply duct and feed screw housing.

One object of the invention is to provide an air supply duct and feed screw housing construction that permits employment of a shear plate having passages therethrough for passage of air from the air duct and into the feed screw housing to overcome and prevent smoke back.

Another object is to provide a novel and inexpensive structure for eliminating smoke back in a stoker wherein positive forward air pressure through the fuel feed tube prevents the escape of gas and smoke.

Another object is to provide a pressure chamber in a shear plate to overcome smoke back in the feed tube.

A further object is to provide an air supply duct and feed screw housing construction which is compact permitting installation in cramped quarters and a substantially shorter air duct and feed screw.

A further object is to provide an air supply duct and feed screw housing assembly that promotes ease of servicing parts.

A further object is to provide an air supply duct and feed screw housing assembly that permits angular location of the retort due to the narrowness of the pyramided tube and duct.

These and other objects of the invention will appear hereinafter in connection with the following description of an embodiment of the invention as illustrated in the accompanying drawings.

In the drawings:

Fig. 1 is a side elevation of the hopper and retort assembly with the retort assembly broken away and sectioned to show the feed screw and air duct;

Fig. 2 is a section taken on line 2—2 of Fig. 1 and looking toward the hopper with the shear plate and hopper wall shown in elevation;

Fig. 3 is a detail side elevation of the assembly with the shear plate and feed screw removed and parts broken away and sectioned;

Fig. 4 is a top plan view of Fig. 3 with parts broken away to show the clean-out plate;

Fig. 5 is a top plan view of the shear plate with the passages therethrough shown in dotted lines;

Fig. 6 is a longitudinal sectional view partially in elevation of the shear plate and hopper assembly with the feed screw removed;

Fig. 7 is a section taken on line 7—7 of Fig. 6.

The drawings illustrate a stoker to which the invention has been applied and which, in general, comprises the retort 1 and the hopper 2 which are connected to each other by the circular feed screw tube 3 and the generally rectangularly shaped air duct 4. The feed screw tube 3 nests within the top of air duct 4 and the feed tube and air duct are welded to retort 1 at their forward ends and to the assembly plate 5 at their rear ends, and the latter is bolted or otherwise secured to hopper 2 to complete the assembly.

The feed screw 6 extends horizontally through tube 3 from within the bottom of hopper 2 and into the retort 1. Feed screw 6 is driven by a motor 6', to feed coal from the hopper to retort 2 through feed tube 3. The motor also drives a blower unit 4', to force air through air duct 4 and into retort 1 when coal is fed thereto to improve the combustion of the fuel. The motor and blower are located within the hopper unit.

The air duct 4 has a central longitudinal opening 7 in the top wall of sufficient width to receive circular feed tube 3. The tube and air duct are pyramided with respect to each other as the top of tube 3 is located a substantial distance above the top of the air duct. The tube is joined on each side to the top of air duct 4 by the longitudinal welds 8 which extend substantially the length of the air duct and tube and seal the joints therebetween.

The upper half of the rear end portion of tube 3 at assembly plate 5 is removed to provide the top opening 9 in the tube adjacent plate 5 which opening is closed by the shear plate 10 when the latter is in place.

Shear plate 10 has a semi-circular body portion 11 formed complementary to tube 3 and which rests on the lower half of tube 3 located beneath opening 9, and the vertical flange 12 which is backed against assembly plate 5. In addition the shoulders 13 on each side of plate 10 overlap the top of air duct 4. The forward end 14 of the plate is offset from body 11 and overlaps tube 3, and the rear end 15 extends slightly within hopper 2.

The wing nuts 16 are threaded onto the studs 17 extending diagonally outwardly from assembly plate 5 to secure the shear plate in place.

Suitable packing material 18 is provided between the forward end 14 of plate 10 and tube 3, between flange 12 and assembly plate 5 and between the bottom of plate 10 and the top of air duct 4, to seal the joints therebetween.

The roof of shear plate 10 is of generally thick vertical cross-section and is provided with the longitudinal passage 19 therethrough which extends downwardly at the forward end and opens into feed screw 3. The respective passages 20 extend downwardly in each side of the shear plate from the rear end of passage 19 through the shoulders 13 and register with the apertures 21 which extend through the top of air duct 4 on each side of the tube opening 9.

A portion of the air forced through air duct 4 flows upwardly through apertures 21 of the air duct, passages 20 and passage 19 of shear plate 10, and thence into feed screw tube 3. The shear plate thus provides a pressure chamber through which a positive forward air pressure is provided in feed tube 3 to prevent the backward flow of gas and smoke into the hopper 2.

Control of the flow of air through air duct 4 to retort 1 is obtained by the damper 22 which extends across the air duct and is adjustable to open automatically a predetermined amount when air is forced through the duct.

The air duct 4 is also provided with the cleanout opening 23 in one side thereof which is covered by the removable plate 24. A hose or other device may be inserted through opening 23 to remove ashes and foreign matter which may fall into the base of retort 1. Plate 24 and opening 23 are located only slightly forwardly from shear plate 10 so that in a compact or angular assembly of the stoker with a furnace unit the plate can be readily removed and replaced.

Shear plate 10 is readily removed by the operator merely unthreading wing nuts 16 from studs 17 and slipping the plate off from the studs.

Ordinarily a shear plate is provided in a stoker for removal to gain access to the inside of the feed tube to take out foreign objects that have caused the feed screw to cease operation due to the shearing of a pin or the like.

However, under the present invention shear plate 10 serves a dual purpose, since it not only operates as a shear plate but also to convey air from air duct 4 into feed tube 3 when blower 4' is in operation to provide a positive forward air pressure in the feed tube that will prevent backward flow of gas and smoke into the hopper and thence out into the room in which the stoker is located.

The invention provides a compact retort assembly and a symmetrical design that is utilized to good advantage in providing a trap for gas and smoke without unsightly or expensive connections. The construction also improves the hopper capacity since the construction permits any extension of air duct 4 beneath the hopper to be located directly beneath the feed screw thus not requiring the hopper to be steeply pitched or otherwise designed to overcome location of an air duct extension to one side of the feed screw.

Various embodiments of the invention may be employed within the scope of the accompanying claims.

I claim:

1. In a stoker, the combination of an air duct and a blower to force air forwardly through said duct, a feed screw housing nested longitudinally within said air duct, a coal feed screw disposed for rotation within said feed screw housing, and a shear plate removably provided at the entrance of the feed screw housing as a part of said housing and overlapping the top of said air duct for removal of foreign objects from the feed screw housing, said shear plate having a passage extending therethrough and being disposed in a forward direction and registering at one end with an aperture in said air duct and leading into the feed screw housing at the other end to by-pass air into the feed screw housing from the air duct and provide positive forward air pressure from the air duct within the feed screw housing and eliminate backward passage of gases and smoke through the housing when said blower is in operation and forcing air forwardly through said air duct.

2. In a stoker, the combination of an air duct and a blower to force air forwardly through said duct, a feed screw housing nested longitudinally within said air duct and welded to the top of the air duct to provide a closure for said air duct, said housing having an opening in the top at the entrance thereof, a vertical plate welded to the rear end of said air duct and feed screw housing, a shear plate removably bolted to said vertical plate and formed to close the opening in said feed screw housing and to overlap the same and the top of the air duct, said shear plate being disposed for removal of foreign material from the feed screw housing, and a passage extending through said shear plate and being disposed in a forward direction and registering at one end with an aperture in said air duct and extending to the inside of the feed screw housing at the other end to by-pass air into the feed screw housing from the air duct and provide positive forward air pressure within the feed screw housing during rotation of the feed screw and thereby eliminate backward passage of gases and smoke through the housing when said blower is in operation and forcing air forwardly through said air duct.

3. In a stoker, the combination of a rectangular shaped air duct and a blower to force air forwardly therethrough, and a generally cylindrical feed screw housing extending longitudinally within the top wall of said duct, a hopper, and a shear plate provided as a part of the feed screw housing at the junction of the hopper and housing and disposed to overlap said air duct with a passage extending therethrough and registering at one end with said air duct and at the other end with the inside of said feed screw housing to by-pass air into the feed screw housing from the air duct and overcome backward flow of gas and smoke therein when said blower is in operation and forcing air forwardly through said air duct.

4. In a stoker, the combination of an air duct and a blower to force air forwardly through said duct, a feed screw housing nested within said air duct, a coal feed screw disposed for rotation within said housing, and a removable access plate assembled with said feed screw housing and disposed to overlap said air duct, said plate having a passage extending therethrough and being disposed in a forward direction and aligned at one end with an aperture in said air duct and leading into the feed screw housing at the other end to by-pass air into the feed screw housing from the air duct and to provide positive forward air pressure within the feed screw housing for eliminating backward passage of gases and smoke through the housing when said blower is in operation and forcing air forwardly through said air duct.

PHILIP C. MALMSTEN.

REFERENCES CITED

The following references are of record in the file of this patent:

UNITED STATES PATENTS

| Number | Name | Date |
|---|---|---|
| 608,819 | Wood | Aug. 9, 1898 |
| 1,974,133 | Carter | Sept. 18, 1934 |
| 1,990,086 | Nelson | Feb. 5, 1935 |
| 2,051,282 | Yerges | Aug. 18, 1936 |
| 2,216,109 | Castagna | Oct. 1, 1940 |
| 2,239,061 | Sourber | Apr. 22, 1941 |

FOREIGN PATENTS

| Number | Country | Date |
|---|---|---|
| 291,764 | Germany | May 8, 1916 |